(12) United States Patent
Chin-Chin

(10) Patent No.: US 6,817,275 B1
(45) Date of Patent: Nov. 16, 2004

(54) PUSH CUTTING DEVICE FOR A TABLE SAW

(76) Inventor: Chang Chin-Chin, No. 41, Nan-Tsun Rd., Hou-Li Hsiang, Taichung Hsien (TW)

( * ) Notice: Subject to any disclaimer, the term of this patent is extended or adjusted under 35 U.S.C. 154(b) by 0 days.

(21) Appl. No.: 10/635,267

(22) Filed: Aug. 6, 2003

(51) Int. Cl.$^7$ ............................................... B26D 7/06
(52) U.S. Cl. .................. 83/435.11; 83/437.1; 83/477.2
(58) Field of Search ............................... 83/477.2, 425, 83/435.11–435.27, 444, 448–450, 438; 144/287; 108/143

(56) References Cited

U.S. PATENT DOCUMENTS

| | | | | |
|---|---|---|---|---|
| 5,201,863 A | * | 4/1993 | Peot | 83/477.2 |
| 5,230,269 A | * | 7/1993 | Shiotani et al. | 83/435.14 |
| 6,508,281 B1 | * | 1/2003 | Wang | 83/477.2 |
| 6,619,348 B2 | * | 9/2003 | Wang | 144/287 |
| 2003/0213349 A1 | * | 11/2003 | Chang | 83/477.2 |

* cited by examiner

*Primary Examiner*—Stephen Choi

(57) ABSTRACT

A push cutting device for a table saw includes seat board adapted to be mounted on a working table of a base of the table saw, a slide plate reciprocally slidably mounted on a top face of the seat board and a slide board reciprocally slidably mounted on a top face of the slide plate. The seat board, the slide plate and the slide board are longitudinally slidably mounted to one another relative to the cutting direction of the table saw such that the cutting stroke of the table saw is elongated, and the cutting effect and the cutting quality are promoted.

4 Claims, 5 Drawing Sheets

US 6,817,275 B1

PUSH CUTTING DEVICE FOR A TABLE SAW

BACKGROUND OF THE INVENTION

1. Field of the Invention

The present invention relates to a push cutting device, and more particularly to a pushing device for a table saw to elongate the work stroke of the table saw.

2. Description of Related Art

A conventional table saw in accordance with the prior art has been widely used in woodworking. The conventional table saw usually includes an adjusting device to adjusting the height and the angle of a saw blade for the workpiece that has different thickness and angle. The adjusting device of the conventional table saw uses a first threaded shaft to push a rotating seat for adjusting the height of the saw blade relative to a working table of the conventional table saw, and second threaded shaft to push a swing seat for adjusting the angle of the saw blade relative to a working table of the conventional table saw. However, the stroke of the workpiece of the conventional table saw is short. Consequently, the conventional table saw is inconvenient to cutting a workpiece that has a long axis corresponding to the cutting direction thereof.

Furthermore, the inclined cutting angle of the saw blade cannot be adjusted easily and exactly, thereby causing inconvenience to the user, and thereby decreasing the precision of cutting the workpiece.

The present invention has arisen to mitigate and/or obviate the disadvantages of the conventional table saw.

SUMMARY OF THE INVENTION

The main objective of the present invention is to provide an improved table saw including a push cutting device that can provide a long cutting stroke to the workpiece.

To achieve the objective, the push cutting device for a table saw in accordance with the present invention comprises a seat board adapted to be mounted on a working table of a base of the table saw. The seat board has a rectangular shape and includes two guiders each parallel to a long axis of the seat board. A slot is defined between the two guider and parallel to the two guiders. A slide plate is reciprocally slidably mounted on a top face of the seat board and includes two first grooves longitudinally defined in two opposite sides of a lower face of the slide plate. Each first groove is slidably receiving a corresponding one of the two guiders of the seat board. Two second grooves are defined in two opposite sides of an upper face of the slide plate and a roller is longitudinally rotatably mounted in and extending through the slide plate. The roller is reciprocally rotated in the slot in the seat board. A slide board is reciprocally slidably mounted on a top face of the slide plate. The slide board includes two rails extending from two opposite sides of a bottom of the slide board. Each rail is slidably received in a corresponding one of the two second grooves in the slide plate.

Further benefits and advantages of the present invention will become apparent after a careful reading of the detailed description with appropriate reference to the accompanying drawings.

DETAILED DESCRIPTION OF THE INVENTION

Figure 1:
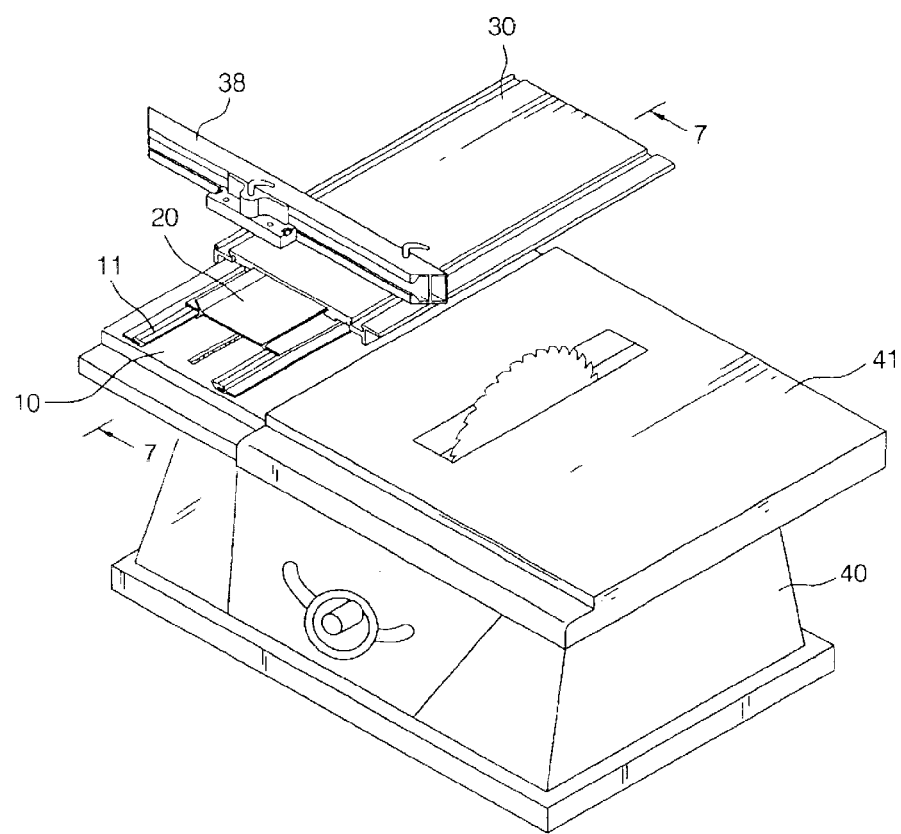
FIG. 1 is a perspective schematic view of a push cutting device for a table saw in accordance with the present invention.
Figure 2:
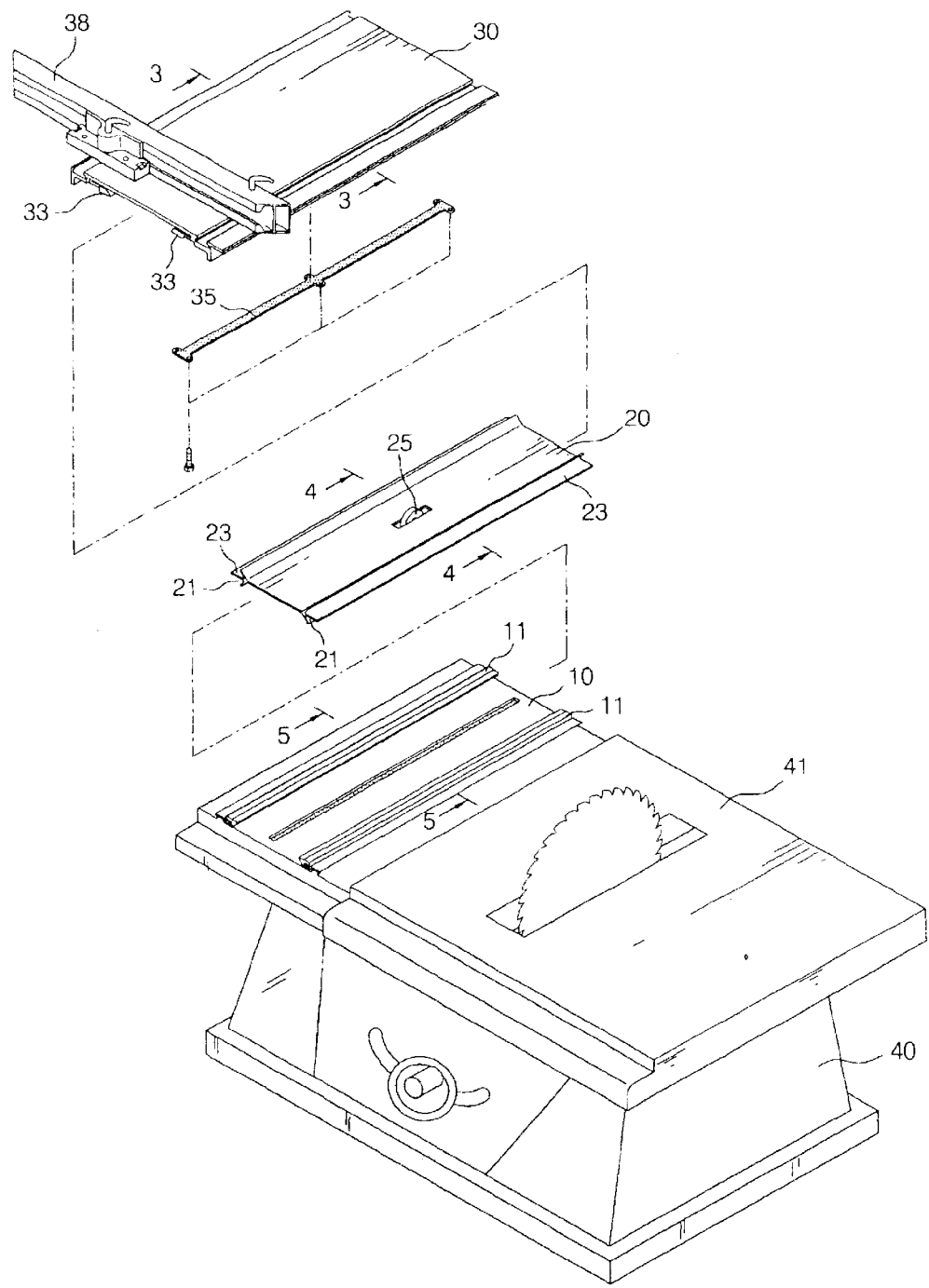
FIG. 2 is an exploded perspective view of the push cutting device in FIG. 1.
Figure 3:
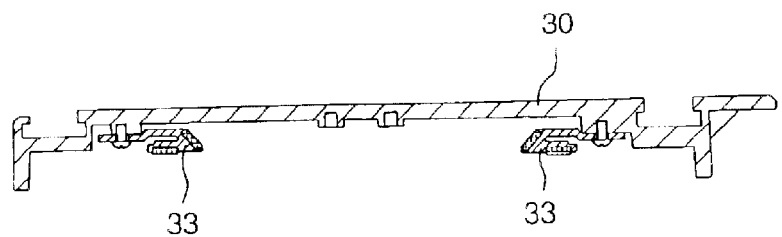
FIG. 3 is a front cross-sectional view of a slide board of the push cutting device in FIG. 1 along line 3—3 in FIG. 2.
Figure 4:
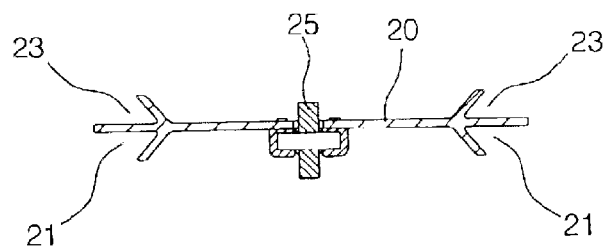
FIG. 4 is a front cross-sectional view of a slide plate of the push cutting device in FIG. 1 along line 4—4 in FIG. 2.
Figure 5:
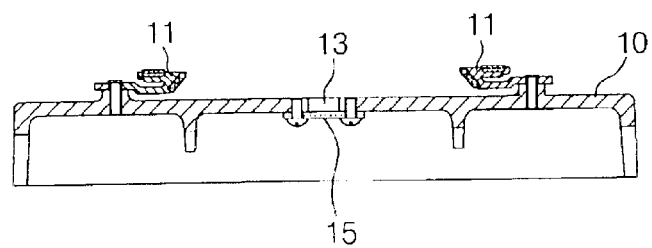
FIG. 5 is a front cross-sectional view of a seat board of the push cutting device in FIG. 1 along line 5—5 in FIG. 2.
Figure 6:
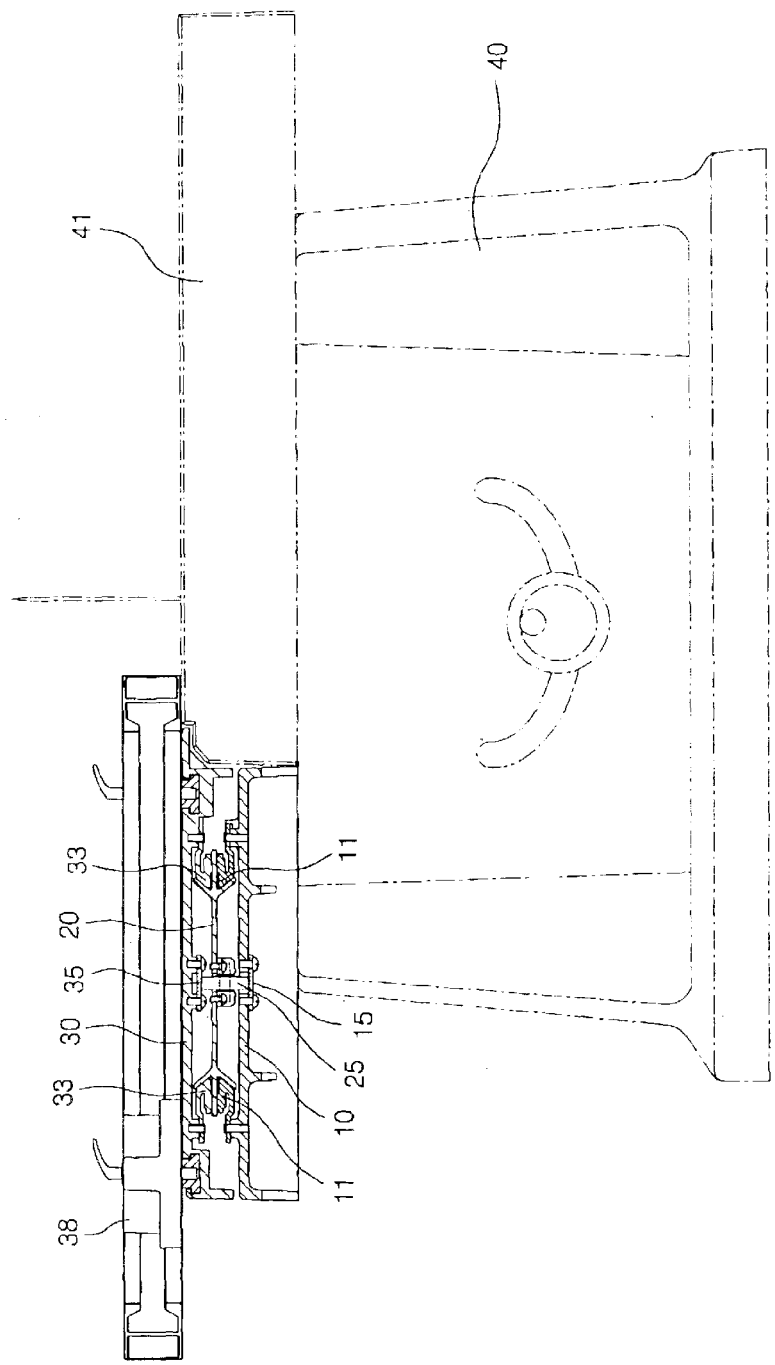
FIG. 6 is a front cross-sectional view of the push cutting device for a table saw in accordance with the present invention.

With reference to the drawings and initially to FIGS. 1–6, a push cutting device for a table saw in accordance with the present invention comprises a seat board (10) adapted to be mounted on a working table (41) of a base (40) of the table saw, a slide plate (20) reciprocally slidably mounted on a top face of the seat board (10) and a slide board (30) reciprocally slidably mounted on a top face of the slide plate (20).

The seat board (10) has a rectangular shape and two guiders (11) each parallel to a long axis of the seat board (10). A slot (13) is defined between the two guiders (11) and parallel to the two guiders (11). The slot (13) extends through the seat board (10) and a first base plate (15) is secured on a bottom of the seat board (10) to close the slot (13). The first base plate (15) is made of plastic material.

The slide plate (20) includes two first grooves (21) longitudinally defined in two opposite sides of a lower face of the slide plate (20). Each first groove (21) slidably receives a corresponding one of the two guiders (11) of the seat board (10). Two second grooves (23) are defined in two opposite sides of an upper face of the slide plate (20). A roller (25) is longitudinally rotatably mounted in and extending through the slide plate (20). The roller (25) abuts and rotates on the first base plate (15) to make the slide plate (20) smooth move on the seat board (10) and absorb the vibration during cutting when the slide plate (20) is slidably mounted on the seat board (10).

The slide board (30) is provided to load the workpiece. The slide board (30) includes two rails (33) extending from two opposite sides of a bottom of the slide board (30). Each rail (33) is slidably received in a corresponding one of the two second grooves (23) in the slide plate (20). A second base plate (35) is longitudinally secured on the bottom of the slide board (30) and abuts the roller (25) to make the slide board (30) smooth move on the seat board and absorb the vibration during cutting when the slide board (30) is slidably mounted to the slide plate (20). A push seat (38) is rotatably mounted on a top face of the slide board (30) to push the workpiece toward a saw blade for cutting when the slide plate (20) and the slide board (30) are forward moved.

As described above, the seat board (10), the slide plate (20) and the slide board (30) are longitudinally slidably mounted to one another relative to the cutting direction of the table saw such that the cutting stroke of the table saw is elongated, and the cutting effect and the cutting quality are promoted.

Figure 7:
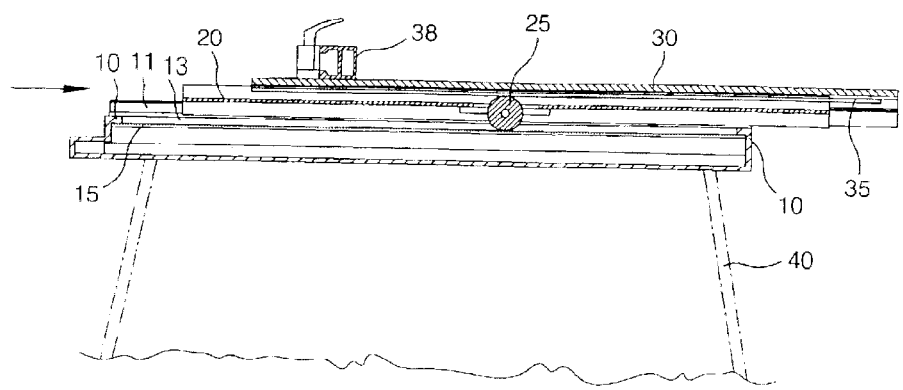
FIG. 7 is an operational side plan view of the push cutting device in FIG. 1 when feeding workpiece.
Figure 8:
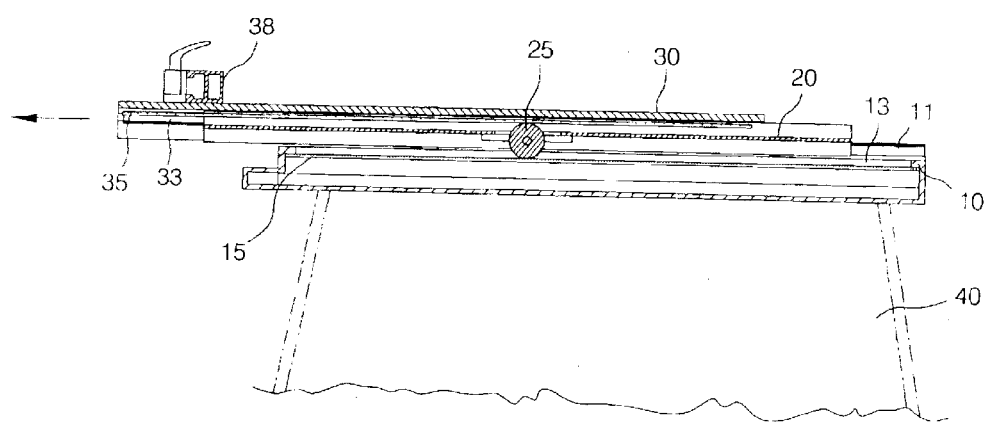
FIG. 8 is an operational side plan view of the pushing cutting device in FIG. 1 when moving back.

With reference to FIGS. 7 and 8, the slide plate (20) is slidably sandwiched between the seat board (10) and the slide board (30). The slide plate (20) is smooth slid between the seat board (10) and the slide board (30) due to the first grooves (21), the second grooves (23) in the slide plate (20), the corresponding guiders (11) and the rails (33). Furthermore, roller (25) is rotated between the first base plate (15) of the seat board (10) and the second base plate (35) of the slide board (30) for absorbing the vibration during cutting when the slide plate (20) is slidably mounted on the seat board (10). The push cutting device in accordance with the present invention uses the relationship of reciprocally slide of the slide plate (20) and the slide board (30) to elongate the cutting stroke of the table saw. Consequently, the table saw with the present invention can be used well whatever the long work piece and the short piece such that the cutting effect and the cutting quality of the table saw are greatly promoted.

Although the invention has been explained in relation to its preferred embodiment, it is to be understood that many other possible modifications and variations can be made without departing from the spirit and scope of the invention as hereinafter claimed.

What is claimed is:

1. A push cutting device for a table saw, comprising:

a seat board adapted to be mounted on a working table of a base of the table saw, the seat board having a rectangular shape and including two guiders each parallel to a long axis of the seat board, and a slot defined between the two guiders and parallel to the two guiders;

a slide plate reciprocally slidably mounted on a top face of the seat board and including:

two first grooves longitudinally defined in two opposite sides of a lower face of the slide plate, each first groove slidably receiving a corresponding one of the two guiders of the seat board;

two second grooves defined in two opposite sides of an upper face of the slide plate; and a roller longitudinally rotatably mounted in and extending through the slide plate, the roller reciprocally rotated in the slot in the seat board; and a slide board reciprocally slidably mounted on a top face of the slide plate, the slide board including two rails extending from two opposite sides of a bottom of the slide board, each rail slidably received in a corresponding one of the two second grooves in the slide plate.

2. The push cutting device for a table saw as claimed in claim 1, wherein the seat board comprises a first base plate secured on a bottom of the seat board to close the slot in the seat board, and the roller abuts and rotates on the first base plate to make the slide plate smooth move on the seat board, the first base plate made of plastic material for absorbing a vibration during cutting when the slide plate is slidably mounted on the seat bard.

3. The push cutting device for a table saw as claimed in claim 1, wherein the slide board comprises a second base plate longitudinally secured on a bottom of the slide board and abutting the roller to make the slide board smooth move on the seat board and absorb a vibration during cutting when the slide board is slidably mounted to the slide plate.

4. The push cutting device for a table saw as claimed in claim 1, wherein the slide board comprises a push seat rotatably mounted on a top face of the slide board, the push seat adapted to push a workpiece toward a saw blade for cutting when the slide plate and the slide board are forward moved.

* * * * *